Nov. 3, 1942.                    E. D. RANEY                    2,300,841
                              CONTROL METHOD
                    Filed May 4, 1940            2 Sheets-Sheet 1

INVENTOR
Eldon D. Raney
BY
Warren H. F. Schmieding
ATTORNEY

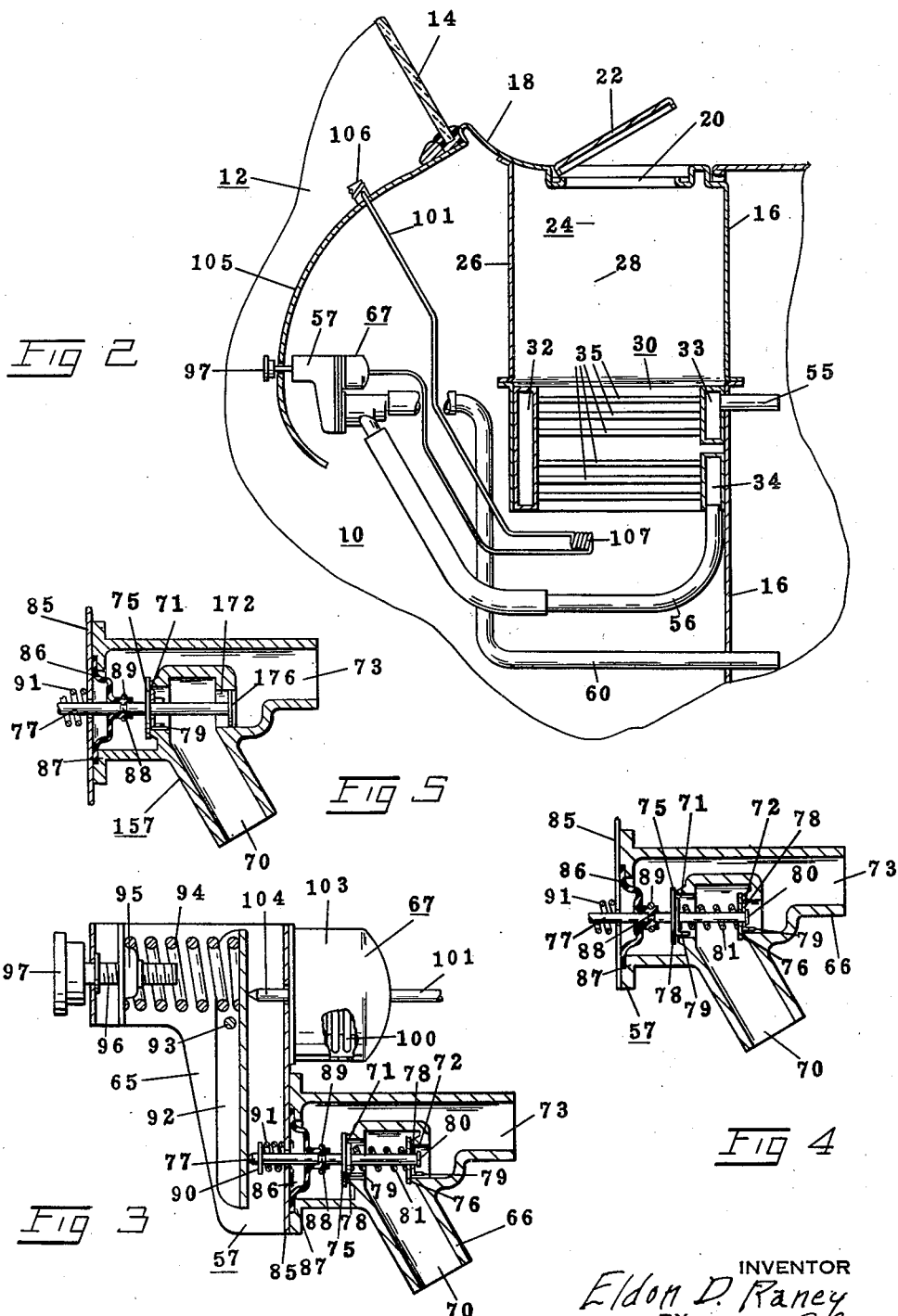

Patented Nov. 3, 1942

2,300,841

UNITED STATES PATENT OFFICE 2,300,841

CONTROL METHOD

Eldon D. Raney, Columbus, Ohio, assignor to Ranco Incorporated, Columbus, Ohio, a corporation of Ohio Application May 4, 1940, Serial No. 333,390

9 Claims. (Cl. 236—36)

The present invention relates to a method of control, and more particularly to a method of controlling the heat exchange between a medium, such as air, and a heat exchange fluid, such as a liquid.

In some heat exchange systems a heat exchange fluid is circulated in heat exchange relation with a medium for affecting the temperature of the medium. The pressure of the circulating fluid frequently varies so that the rate of circulation of the fluid tends to increase and decrease as the pressure increases and decreases, respectively. Also, the rate of circulation of the medium into heat exchange relation with the fluid is caused to increase and decrease coordinately as the pressure of the fluid is increased and decreased, respectively. In order to maintain a uniform temperature of the medium it is an object of the present invention to control the rate of circulation of the fluid in accordance with changes in temperature of the medium and in accordance with a portion only of the increment or decrement change in pressure of the fluid.

Another object of the invention is to control the rate of circulation of the fluid by a valve, which valve is subjected to the entire increment or decrement changes in pressure of the fluid within a predetermined range of movement thereof and subjected to only a portion of the increment or decrement changes in pressure of the fluid within a second predetermined range of movement of the valve.

Other and further objects and advantages will be apparent from the following description, reference being had to the accompanying drawings wherein preferred forms of embodiments of the present invention are clearly shown.

In the drawings:

Fig. 2 is a view on an enlarged scale, of the heat exchanger and control valve shown in Fig. 1, showing a modification of the thermostatic system for the valve;

Fig. 3 is a view, partly in section, of the thermostatic valve for controlling the temperature of the heat exchanger;

Fig. 4 is a fragmentary view of the valve shown in Fig. 3, showing the valve partly open, and Fig. 5 is a sectional view of an alternate form of valve.

Figure 1:
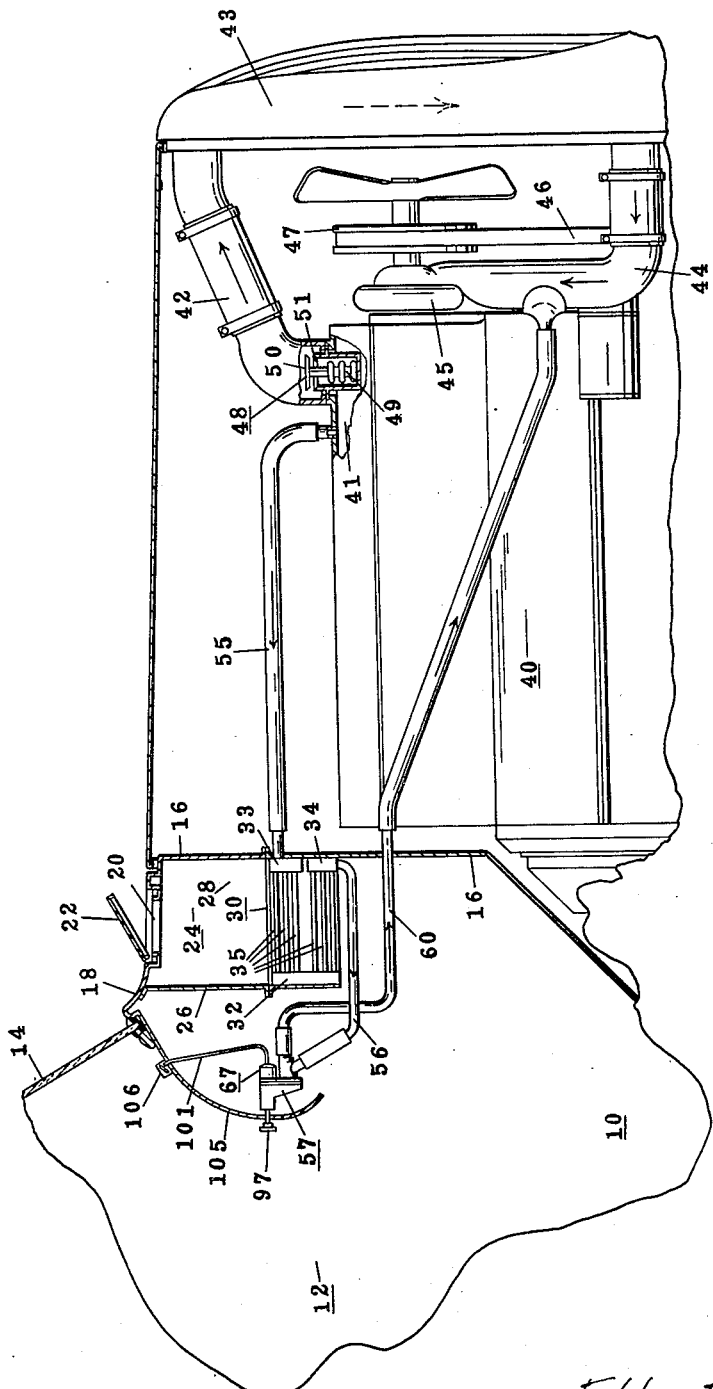
Fig. 1 is a fragmentary view, partly in section, of an automobile showing a heat exchanger for heating the air in the passenger compartment of the automobile and a thermostatically operated valve for regulating the flow of heat exchange fluid through the exchanger.

Although the present invention might be adapted to many different forms of heat exchange systems, a preferred embodiment is illustrated in the drawings wherein a heat exchange fluid is circulated into heat exchange relation with air flowing into the passenger compartment of an automobile. The automobile is designated at 10, which automobile is provided with a closable passenger compartment 12, the forward part of which compartment is shown in the drawings. The compartment 12 includes a windshield 14, front wall 16 and a cowl 18. The cowl 18 is provided with an opening 20, which opening may be closed by a cover 22. The cover 22 is suitably hinged adjacent the rearward edge of the opening so that the cover may be tilted upwardly to deflect air into the opening when the automobile is in forward motion. Mechanism for tilting the cover as described is well known and therefore it is not shown.

A duct 24 is formed by walls 26, 28 and the front wall 16. Two walls 28 confront one another and only one appears in the drawings. The walls 26 and 28 are attached at the top edges thereof to the cowl so that the duct directs the air entering the opening 20 downwardly. A heat exchanger 30 is attached to the lower end of the duct 24. The exchanger may be any suitable type, but in the present disclosure it comprises a header 32 connected with an upper header 33 and a lower header 34 by copper tubes 35. The tubes 35 are spaced apart laterally with respect to one another so that the air passing out the lower end of the duct 24 will strike the tubes. The tubes 35 are heated by a heat exchange fluid which enters the header 33, traverses the upper tubes 35 to the header 32 and thence flows to the header 34 through the lower tubes 35. The heat exchange fluid may thus be circulated in heat exchange relation with the air entering the compartment.

The heat exchange fluid, in the present embodiment, is hot liquid that is supplied to the exchanger 30 from the cooling system of the automobile engine 40. The engine 40 is a water cooled, internal combustion type engine. Water or other suitable cooling liquid is circulated through a water jacket 41, surrounding the cylinders of the engine, through a conduit 42 to a radiator 43, through conduit 44 to a centrifugal pump 45, whence the liquid is discharged into the water jacket. The pump 45 is driven by a belt 46 and pulley 47, which belt and pulley are driven by the engine. Thus the pressure of the circulating liquid is proportional to the speed of the engine since the speed of the pump 45 affects the pressure of the liquid.

A thermostatic valve 48 is positioned at the discharge of the water jacket to prevent circulation of the liquid to the radiator 43 until the temperature of the liquid in the jacket is raised to a predetermined temperature, for example 160 degrees F. Such valves are well known and they may comprise a fluid filled bellows 49 connected with a valve 50 adapted to close a valve port 51, When the temperature of the liquid rises to 160 degrees F., the fluid in the bellows 49 expands the bellows to cause the valve to open and when the liquid falls below 160 degrees F., the fluid in the bellows contracts and the bellows collapses to close the valve. Thus, while the engine is operating the temperature of the liquid in the water jacket will be maintained at least at 160 degrees F.

Hot liquid is supplied to the header 33 through a conduit 55. The liquid discharges from the exchanger through a conduit 56 to a thermostatically controlled valve 57 and from the valve the liquid is returned to the conduit 44 through a conduit 60.

It is apparent that when the speed of the automobile is increased, a greater quantity of air flows over the heat exchanger 30 and into the passenger compartment. Also, due to the increased speed of the engine, the liquid pressure in the exchanger increases. If the valve for controlling the flow of liquid through the exchanger was responsive only to the temperature in the compartment 12, the temperature of the air discharged from the heater would be lowered because of the increased flow of air therethrough. This would produce a cool draft on the occupants in the forward part of the automobile compartment until the thermostat in the compartment would be affected by the cool air and this cool draft would continue until the cool air reached the thermostat. Also if the speed of the automobile should be reduced, the temperature of the air discharged from the exchanger would increase because substantially the same quantity of liquid would continue to flow through the exchanger and this reduced quantity of air would be heated excessively.

If the valve for controlling the flow of liquid through the exchanger was biased open by the entire pressure of the liquid effective on the valve, an increase in the speed of the automobile would increase the pressure of the liquid and cause increased opening of the valve. Consequently the quantity of liquid that would flow through the exchanger would be increased. This increased flow of liquid would heat the air passing through the exchanger to a temperature above that desired and hot air would then pass over the occupants in the forward part of the compartment 12 until the thermostatic system for operating the valve would be affected for reducing the valve opening. This condition would be particularly true where the liquid capacity of the exchanger was designed to adequately heat air at extremely low temperatures. When the speed of the engine would be reduced the liquid pressure would be reduced and the valve would be moved toward closed position by the thermostat. This would materially reduce the quantity of liquid flowing through the exchanger and the air discharged from the exchanger would then be comparatively cool until the low temperature of the air in the compartment affected the thermostat to increase the opening of the valve.

I have discovered that by controlling the flow of heating fluid through the exchanger in accordance with changes in temperature of the air in the passenger compartment and also in accordance with a portion only of the increment or decrement changes in the pressure of the liquid on the liquid control valve the air temperature in the compartment 12 can be maintained more uniform. Accordingly, in the present embodiment of the invention the liquid control valve 57 is designed to be biased open by a portion only of the liquid pressure effective on the valve so that an increase or decrease in liquid pressure will increase or decrease, respectively, the valve opening a limited extent whereby the change in rate of the flow of liquid will be such to maintain the temperature of the air discharged from the exchanger substantially constant as the volume of air passing through the exchanger increases and decreases, respectively.

The valve 57 comprises a frame 65 on which a valve body 66 and a thermostatic system 67 are mounted. The valve body is formed having an inlet 70, ports 71 and 72 and an outlet 73. The ports 71 and 72 are adapted to be closed by valve plates 75 and 76, respectively. The valve plate 75 is rigidly secured to a valve stem 77 and the plate 76 is slidingly mounted on the stem. A washer 78 is secured to each valve plate, which washers are provided with spurs 79 that are adapted to engage the walls of the ports to maintain the stem aligned centrally of the ports. A shoulder 80 is formed on one end of the stem and a coil spring 81 is compressed between the valve plates 75 and 76 for constantly urging the plate 76 toward the shoulder 80. When the plate 76 is abutting the shoulder 80 and seating over the port 72, the valve plate 75 is spaced slightly from port 71, as illustrated in Fig. 4. Thus the plate 75 will open the port 71 before the shoulder 80 engages the plate 76 for opening port 72. Preferably the port 72 is smaller than the port 71 so that when both valve plates are opened slightly, the pressure of the liquid on the plate 75 will be slightly greater than the liquid pressure on the plate 76.

The stem 77 extends outwardly from the valve body and through an opening in a wall 85 of the frame 65. The valve body is suitably attached to the wall 85. A hermetic seal is provided between the stem and walls of the valve body, which seal comprises a flexible water proof diaphragm 86 having a centrally disposed neck through which the stem 77 extends. The peripherial edges of the diaphragm are compressed between the wall 85 and a circular flange 87 formed in the valve body. The material of the neck of the diaphragm is compressed into a groove 88, formed in the stem 77, by a wire ring 89. A washer 90 is secured to the outer end of the stem 77 and a compression spring 91 is positioned about the stem between the wall 85 and washer 90 for biasing the stem to open the valve.

The valve stem is actuated by a lever 92 pivoted on the frame 65 by a pin 93. A heavy compression spring 94 tends to rotate the lever 92 clockwise, as viewed in Fig. 3. Spring 94 is mounted intermediate the lever and a washer 95. The tension of the spring is adjusted by an adjusting mechanism comprising the washer 95 threaded on a rotatable stud 96, which washer moves toward or away from the lever 92 when the stud is rotated. A knob 97 is provided for rotating the stud. The lever 92 is rotated counterclockwise by the thermostatic system 67. This system comprises a bellows 100 having a closed tube 101 attached thereto. The bellows and tube are filled with a thermal responsive fluid, such as sulphur dioxide, the quantity of fluid being such that above 96 degrees F. the fluid is entirely in the form of vapor or gas, but below 96 degrees F. the fluid is partly liquid and partly vapor. An internal stop, not shown, is provided in the bellows for limiting the collapse thereof so that when the valve is fully opened, due to collapsing of the bellows, the plate 76 is moved from its seat less than midway between its seat and the opening of the port 71. The bellows is enclosed in a shell 103 that is attached to the wall 85. A pin 104 interconnects a movable wall of the bellows with the lever 92.

An instrument panel 105 is shown extending downwardly from the windshield into the passenger compartment. The valve 57 is mounted on the forward side of the panel and the knob 97 extends through the panel to be accessible to the operator of the automobile.

In the form of embodiment shown in Fig. 1, the tube 101 of the thermostatic system is extended upwardly through the panel 105 and a portion thereof is coiled at 106 adjacent the windshield. The length of tube forming the coil is such that all of the liquid condensed in the system at a temperature substantially below 70 degrees F. may be retained within the portion of the tube forming the coil. The coil will ordinarily be the coolest portion of the thermostatic system due to its proximity to the windshield. As is well understood, the vapor pressure within the thermostatic system will vary with changes in temperature of the coolest part of the system and thereby flex the bellows to operate the lever 92. The temperature at which the valve will be opened depends on the pressure tending to compress the bellows. The pressure is provided by the spring 94 and the pressure of the liquid at the valve inlet on the valve plate 75 less the liquid pressure on the valve plate 76.

When the automobile is in motion, hot liquid from the engine is directed to the exchanger 30 under pressure of the pump 45. Also, when the cover 22 is tilted upwardly, air is forced over the exchanger and into the compartment 12. The quantity of air directed over the exchanger is proportional to the speed of the car. Also, the pressure of the liquid in the exchanger will be proportional to the speed of the car.

Preferably the spring 94 is adjusted so that when the temperature of the coil 106 decreases to approximately 70 degrees F. and the automobile engine is operating at a relatively low speed, the vapor pressure on the bellows will be reduced to permit the valve to open. During the initial opening movement of the stem 77, the plate 75 moves from the port 71 while the plate 76 remains over the port 72. The entire pressure of the liquid on the plate 75 will react on the bellows and as the speed of the engine increases and decreases, the entire increment or decrement, respectively, of the change in pressure of the liquid will react on the bellows. An increase in liquid pressure increases the valve opening. When the stem 77 moves a predetermined distance in the valve opening direction, the shoulder 80 raises the plate 76 from its port. Liquid then flows through port 72 and tends to urge the plate 76 to its closed position. This partially counterbalances the pressure of the liquid tending to open the valve plate 75 since the port 72 is slightly smaller in area than the port 71. Thus when the engine speed is increased and decreased with both valve ports opened, the opening tendency of the valve is affected by a portion only of the increment or decrement change in pressure. The reference to the increment or decrement change in pressure herein, refers to the increase or decrease, respectively, of the liquid pressure on the plate 75.

It is apparent that without the counterbalancing effect provided by the pressure of the liquid on the plate 76, the entire increment or decrement change in pressure of the liquid on the valve plate 75 would materially affect the operation of the thermostatic system. For example, should the speed of the engine be increased, the entire increase of the liquid pressure against the valve plate 75 would increase the valve opening, and the temperature of the air discharged from the exchanger would be increased. Also, the increased pressure on the valve would prevent throttling of the valve until the temperature of the coil 106 was raised considerably above 70 degrees F. By utilizing a portion only of the increment of change in pressure of the liquid to bias the valve opened, the quantity of liquid flowing through the exchanger is increased sufficiently to maintain the temperature of the increased volume of air passing through the exchanger substantially constant. Likewise when the speed of the automobile is decreased the flow of liquid and air are reduced to cause the temperature of the air discharging into the compartment to remain substantially constant.

By arranging the plate 76 to close prior to the closure of the plate 75, the liquid pressure will tend to maintain the valve plate 76 open to permit a small quantity of liquid to circulate through the exchanger although the temperature of the coil 106 is 70 degrees F. or slightly above. This flow of liquid maintains the exchanger warm to prevent sudden cold drafts of air from entering the compartment.

Referring to Fig. 2, the tube 101 is provided with an additional coil 107 formed intermediate the bellows and coil 106. The coil 107 is disposed immediately beneath the air discharge of the exchanger. In this embodiment the amount of fluid in the thermostatic system is such that the condensed fluid may be contained wholly within either one of the coils 106 or 107 when the temperature of either coil is substantially below 70 degrees F. If a draft of air, below the temperature for which the valve is set to open, is discharged through the exchanger, the coil 107 will be affected and the fluid will condense in the coil 107 and cause the valve to open. This occurs although the coil 106 is above the temperature at which the valve is adjusted to open.

An alternate form of a liquid control valve is shown at 157 in Fig. 5. This valve is similar, in certain respects, to valve 57, and like parts are referred to by the same reference numerals. The valve 157 includes the inlet 70, port 71, outlet 73, stem 77, and valve plate 75 for closing the port 71. A piston 176 is secured on the end of the stem 77 and closely fits the walls of a cylinder 172, which cylinder interconnects the inlet and outlet of the valve. The area of the piston 176 is less than the area of the port 71. It is apparent that the differential in the liquid pressure between the inlet and outlet of the valve acts on the piston for counterbalancing a portion of the liquid pressure on the plate 75, and that the counterbalancing is effective for all positions of the valve plate 75.

The valve 157 is actuated by the thermostatic system 67 in a manner similar to that described with reference to the valve 57.

It is apparent that the flow of liquid through the exchanger is controlled in accordance with temperature of the air in the inclosure and in accordance with a portion only of the increment or decrement change in pressure of the liquid.

While the forms of embodiments of the present invention as herein disclosed constitute preferred forms, it is to be understood that other forms might be adopted, all coming within the scope of the claims which follow.

I claim:

1. The method of controlling the temperature in a compartment of an engine driven automotive vehicle which consists in directing air from the exterior of the compartment over a heat exchanger and into the compartment at a rate which increases and decreases as the speed of the vehicle increases and decreases, directing a heat exchange medium to the exchanger under a pressure which increases and decreases as the speed of the engine increases and decreases, and controlling the flow of the heat exchange medium through the enchanger by a valve which is subjected to the pressure of the medium and urged in one direction by said pressure, and controlling the valve in accordance with changes in temperature of the air in the compartment and in accordance with a portion only of the increment or decrement changes in pressure of the medium urging said valve in said one direction.

2. In an automobile vehicle, including a compartment, an engine for propelling the vehicle; a heat exchanger; means for directing air from the exterior of the compartment over the exchanger and into the compartment at a rate which increases and decreases as the speed of the vehicle increases and decreases; means for circulating a heat exchange medium through the exchanger under pressure, which pressure increases and decreases as the speed of the engine increases and decreases; a valve for controlling the flow of said medium through the exchanger, said valve being urged in one direction by the pressure of said medium; means responsive to the pressure of the medium for counteracting the effect of said pressure on the valve and means for controlling said valve in accordance with the temperature in the compartment of the vehicle.

3. In an automobile vehicle including a compartment, an engine for propelling the vehicle; a heat exchanger; means for directing air from the exterior of the compartment over the exchanger and into the compartment at a rate which increases and decreases as the speed of the vehicle increases and decreases; a pump for forcing a heat exchange medium through the exchanger, said pump being driven by the engine; a valve for controlling the flow of said medium through the exchanger, said valve being urged in one direction by the pressure of said medium; means responsive to the pressure of the fluid for counteracting the effect of the said pressure on the valve; and means for controlling the said valve in accordance with the temperature in the compartment of the vehicle.

4. In a system for conditioning air for a compartment, a heat exchanger; means for circulating a heat exchange medium through the exchanger under pressure which increases and decreases; means directing air over the exchanger and into the compartment at a rate which increases and decreases as the pressure of said medium increases and decreases; a valve for controlling the flow of said medium through the exchanger; and means for controlling the valve in accordance with variations in the temperature in the compartment and in accordance with a portion only of the increment or decrement change in pressure of the medium at the valve.

5. In an automobile vehicle, including a compartment, an engine for propelling the vehicle; a heat exchanger; means for directing air from the exterior of the compartment over the exchanger and into the compartment at a rate which increases and decreases as the speed of the vehicle increases and decreases; means for circulating a heat exchange medium through the exchanger under pressure, which pressure increases and decreases as the speed of the engine increases and decreases; a valve for controlling the flow of said medium through the exchanger, said valve being urged toward its open position by the pressure of the medium; means responsive to the temperature in the compartment for affecting the movement of the valve; means responsive to the pressure of the medium at the inlet of said valve for counteracting opening movement of the valve, and means for rendering the fourth mentioned means effective only after the valve is opened an appreciable amount.

6. In combination with a heat exchanger, means for circulating a heat exchange fluid through the exchanger; means for controlling the flow of fluid through the exchanger including a valve, said valve being urged in one direction by said fluid; means responsive to the pressure of the fluid for yieldingly counteracting the effect of the fluid pressure on the valve; and means for rendering the third mentioned means effective only after said valve has moved in one direction an appreciable amount.

7. In combination with a heat exchanger, means for circulating heat exchange fluid through the exchanger; means for controlling the flow of fluid through the exchanger including a valve, said valve being urged toward its open position by said fluid; means responsive to the pressure of the fluid for yieldingly counteracting the tendency of the valve to be moved toward its open position; and means for rendering the third mentioned means effective only after said valve has opened an appreciable amount.

8. In combination with a heat exchanger, means for circulating a heat exchange fluid through the exchanger; means for controlling the flow of fluid through the exchanger including a valve, said valve being movable toward a position for restricting the flow of fluid and toward another position to increase the flow of fluid, said valve being urged toward one of said positions by said fluid; means for yieldingly counteracting the effect of the fluid pressure on the valve; and means for rendering the third mentioned means effective only after the valve has moved toward said one position an appreciable amount.

9. In combination with a heat exchanger, means for circulating a heat exchange fluid through the exchanger; means for controlling the flow of fluid through the exchanger including a valve, said valve being movable toward a position for restricting the flow of fluid and toward another position for increasing the flow of fluid, said valve being urged toward one of said positions by said fluid; means responsive to the fluid pressure for yieldingly counteracting the effect of the fluid pressure on the valve; and means for rendering the third mentioned means effective only after the valve has moved an appreciable amount toward said one position.

ELDON D. RANEY.